E. W. FOTHERGILL.
TIRE VULCANIZING MOLD.
APPLICATION FILED FEB. 4, 1919.
1,331,146.
Patented Feb. 17, 1920.
3 SHEETS—SHEET 3.
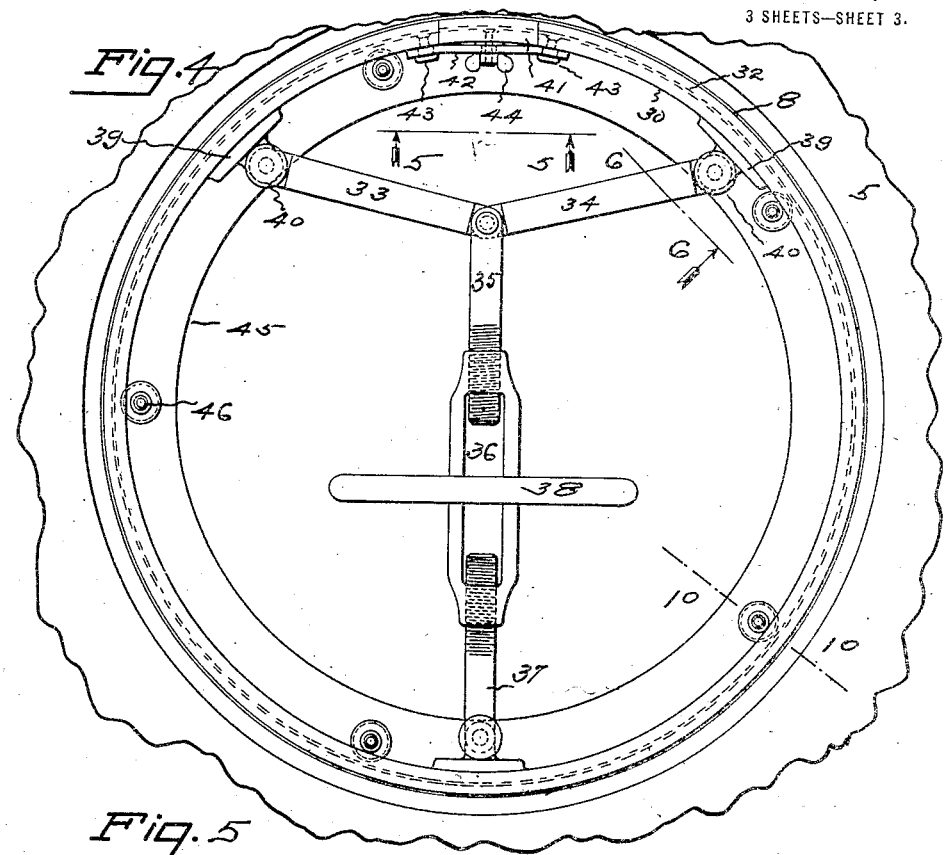
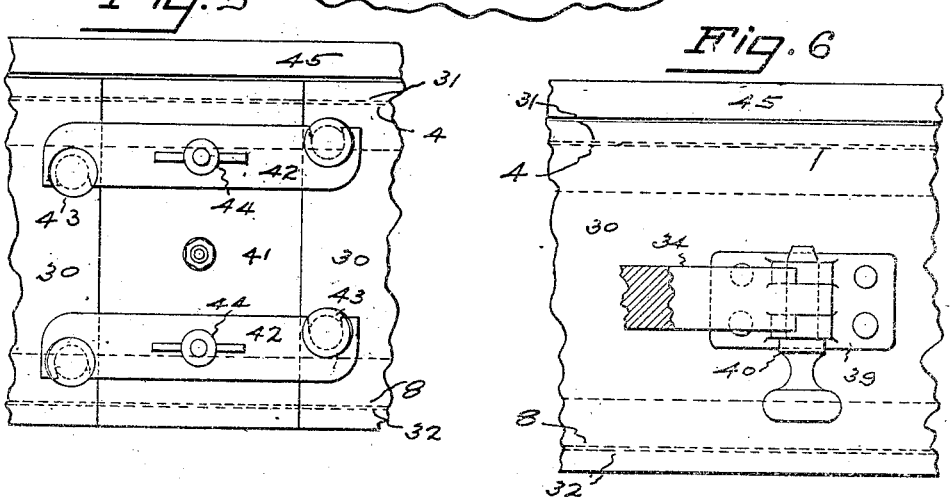
Inventor
Edmund W. Fothergill
Harry R. Williams
Attorney

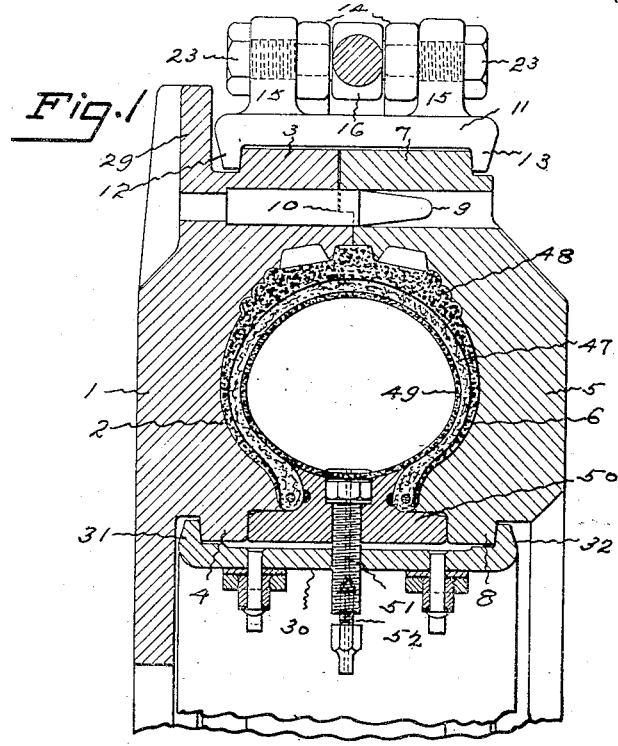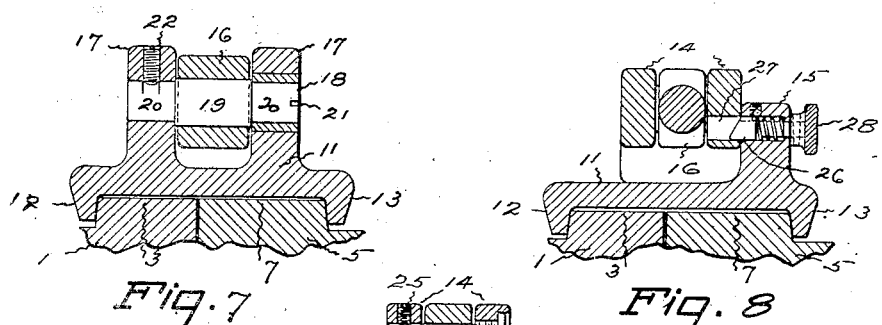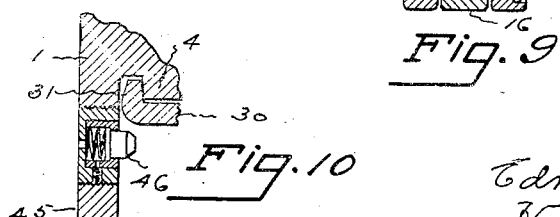

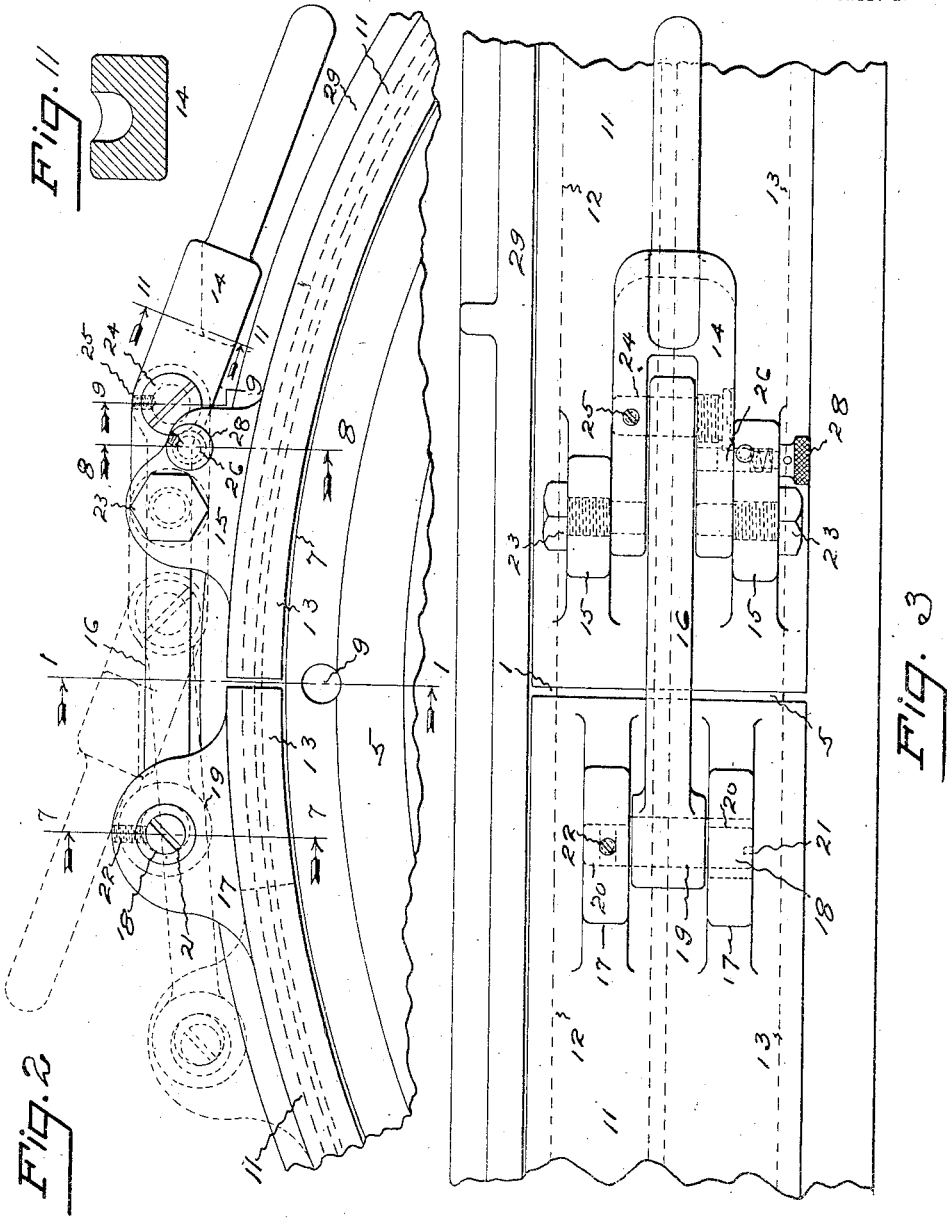

UNITED STATES PATENT OFFICE.

EDMUND W. FOTHERGILL, OF HARTFORD, CONNECTICUT, ASSIGNOR TO HARTFORD RUBBER WORKS COMPANY, A CORPORATION OF CONNECTICUT.

TIRE-VULCANIZING MOLD.

1,331,146.  Specification of Letters Patent.  Patented Feb. 17, 1920.

Application filed February 4, 1919. Serial No. 274,854.

*To all whom it may concern:*

Be it known that I, EDMUND W. FOTHERGILL, a citizen of the United States, residing at Hartford, in the county of Hartford and State of Connecticut, have invented a new and useful Improvement in Tire-Vulcanizing Molds, of which the following is a specification.

In the manufacture of automobile tires rubber impregnated fabric or cord carcasses or bodies built up to approximate shape and with the treads and outer rubber covering applied are placed in vulcanizing molds. These molds, consisting of two annular plates with a section of mold cavity in each, face to face with the uncured body between are placed in a press which forces the plates together and compresses the carcass into the cavity. The mold plates are, while in the press, fastened together usually by clamp screws, bolts and nuts or similar means passing from one plate to the other, and after the carcass is expanded into all parts of the cavity, the loaded mold which is quite heavy is placed in a vulcanizing press and under heat and pressure the rubber is vulcanized to the desired degree.

The object of this invention is to provide a mold of this class with means for fastening the annular mold plates together which will eliminate all bolts, screws and nuts or similar means for securing the plates together, and that can be manipulated easily and quickly when the mold is closed or is to be opened, and which will hold the plates together very strongly, and thereby strengthen yet lighten the weight of the mold and effect a saving of time and labor in handling the mold and insure satisfactory results.

This object is attained by shaping the edges of the mold plates in such a manner and providing clamping rings with expanding and contracting means so arranged about and engaging the edges of the plates that when the rings are contracted if on the exterior of the mold, or expanded if on the interior of the mold, the plates will be drawn together and any tendency for the plates to separate or open under internal pressure will be met with increasing resistance.

Figure 1 of the accompanying drawings shows a transverse section of a tire mold constructed according to this invention with a tire in place between the plates which are tightly and strongly secured together by outer and inner clamping rings. Fig. 2 is a plan of a portion of the mold showing the ends of the external clamping ring and the means for contracting and expanding this ring. Fig. 3 shows an edge view of the same. Fig. 4 is a plan of a portion of the mold showing an internal clamping ring and the means for expanding and contracting this ring. Fig. 5 is a view on larger scale looking outward toward a portion of the internal ring from the plane of the dotted line 5—5 on Fig. 4. Fig. 6 is a like view looking from the plane of the dotted line 6—6 on Fig. 4. Fig. 7 is a section of the external ring on the plane indicated by the dotted line 7—7 on Fig. 2. Fig. 8 is a section on the plane indicated by the dotted line 8—8 on Fig. 2. Fig. 9 is a section on the plane indicated by the dotted line 9—9 on Fig. 2. Fig. 10 is a section showing one of the devices for temporarily retaining the internal ring when contracted, the section being taken on the plane indicated by the dotted line 10—10 on Fig. 4. Fig. 11 is a section on the plane indicated by the dotted line 11—11 on Fig. 2.

The lower plate 1 of the mold which is substantially annular and has a section 2 of the mold cavity in its upper face, has a flange 3 around its outer edge and a flange 4 around its inner edge. The upper mold plate 5 with section 6 of the mold cavity is of similar shape with a flange 7 around its outer edge and a flange 8 around its inner edge. These plates are so shaped that their meeting faces will close together tightly with the walls of the cavities complementing each other and forming a properly outlined tire cavity. The plates are preferably guided together by dowel pins 9 and held from sidewise displacement when closed by a mortise or tongue joint 10 as illustrated in Fig. 1.

The external ring 11 which may be made of one or more pieces is desirably rolled into annular form a little larger than the diameter of the mold plates which it encircles, from a piece of channel iron so as to provide inwardly-extending flanges 12 and 13. The inner faces of these flanges are desirably beveled, as is the lower face of the flange 3 and the upper face of the flange 7 on the exterior of the mold plates. A hand lever 14 is pivoted between outwardly-extending ears 15 on one side of the joint of the ring, and a link 16 has one end pivoted between ears 17 that extend outwardly from the ring on the other side of the joint. The other end of this link is pivoted to the lever a short distance away from the fulcrum of the lever so that by swinging the lever out the ring will be expanded, and by swinging the lever in the ring will be contracted upon the flanges on the outside of the mold in such a manner as to draw together and hold the mold plates tightly face to face. The stud 18 which pivots the link between the ears on one end of the ring has its central portion 19 eccentric with relation to the end portions 20 which extend through the ears so that the stud may be turned to vary the distance between the axis of the link and axis of the lever and thus adjust the amount of contraction of the ring upon the flanges of the mold plates. The stud desirably has a slot 21 in one end for the application of a screw driver, by means of which it may be turned, and a set screw 22 is turned in through one ear against an end of the stud for the purpose of locking it after it has been adjusted. The lever is preferably forked and is pivoted to the ears by screw studs 23, and the link extends between the forked end of the lever and is connected by a screw stud 24 which is locked in position by set screw 25. For the purpose of holding the lever swung in with the ring contracted, that is, to prevent the accidental swinging out of the lever and opening of the ring, a spring bolt 26 is arranged to project through one of the ears into an opening 27 in one side of the lever, this bolt having a head 28 which may be grasped for drawing the bolt up against the thrust of the spring and releasing the lever so that it may be swung out for expanding the ring. In order to support the ring when it is expanded and before the upper plate is pressed down, it is desirable to provide a web 29 around the outer edge near the bottom face of the lower mold plate. This web supports the ring when it is expanded in such position that while not interfering with the lowering to position or removal from position of the upper mold plate when the plates are together it is only necessary to swing the lever in and contract the ring for binding the plates together.

Located around the inside of the mold is a ring 30 which may be made of one or more pieces and is desirably rolled up of channel iron so as to provide flanges 31 and 32 which extend outwardly. The inner faces of these flanges are beveled, as is the lower face of the flange 4 and the upper face of the flange 8 on the inner edges of the plates, so that when the ring is expanded the flanges on the ring will wedge the flanges on the plates and draw the meeting faces of the plates closely together. This internal ring is shown as expanded by means of a toggle formed of the arms 33 and 34 and link 35, which link is connected by the turn-buckle 36 with a link 37. Turning the hand wheel 38 of the turn-buckle in one direction will collapse the toggle and contract the ring, while, of course, turning the handle in the opposite direction will straighten the toggle and expand the ring. The toggle arms and link 37 are preferably hinged to brackets 39 by removable pintles 40 so that they may be easily disconnected when desired. In order to fill the gap between the ends of this internal ring when it is expanded, a plate 41 is inserted and this plate is provided with swiveled latches 42 arranged to engage studs 43 on the ends of the rings. When the latches are turned to secure the plate in place, thumb screws 44 are screwed up to secure the latches. When the ring is to be contracted so that the mold plates may be separated, the thumb screws are loosened, the latches are turned, and then the plate may be removed. In order to support this internal ring when it is collapsed, a web 45 is provided around the inner lower edge of the bottom mold plate and at suitable points spring plungers 46 may be arranged for engaging the ring flange so as to hold the internal ring contracted in a position which will not obstruct the placing upon or removal of the upper mold plate from the lower mold plate. When the mold plates are put together and the internal ring is to be expanded for securing their inner edges, the turn-buckle is turned and the toggle straightened, and as the ring expands it slides over the plungers and frees itself therefrom.

In the apparatus illustrated the external ring is expanded by swinging the hand lever outward and the internal ring is contracted by collapsing the toggle. With the external ring expanded and the internal ring contracted and resting on their respective supports, the uncured tire consisting of the carcass 47 of rubber impregnated fabric or cords and covered with the rubber tread 48 is placed in the cavity of the lower mold plate. An air bag or inner tube 49 may, if desired, be arranged in the tire, and a packing ring 50 located in position around the inner opening to the mold cavity and between the inner edges of the tire. Extending through the packing ring, the air bag if there is one, and the internal expansion ring, or preferably the gap in said ring or plate 41 when employed, is a tube 51 with a needle valve 52. The upper mold plate is lowered to position and forced down so as to press the tire into the cavity. When the plates are closed tightly the outer ring is contracted by swinging the lever inward and the inner ring is expanded by rotating the turn-buckle wheel, until the flanges of the respective rings slide upon the flanges on the edges of the mold plates and bind the mold plates together. In this condition, air or other fluid may be pumped through the air tube, and after the tire has been expanded under great internal pressure so that it fills all portions of the mold, the valve is closed to retain this pressure and the mold then placed in the vulcanizing press and the tire vulcanized. After the vulcanization has been completed the external ring is expanded and the internal ring contracted so as to release the mold plates, and leave the upper plate free to be lifted off and the tire removed.

In practice it has been found that a mold embodying this construction may be held together sufficiently secure by the external ring only. The good results may also be obtained with only the internal ring, but to insure absolute certainty of holding of the mold plates together while the tire is being vulcanized and while the interior is subject to a large pressure, both the inner and outer rings may be employed. It is unnecessary to employ the air bag or inner tube, provided the parts are so packed as to prevent the escape of the fluid used to expand the tire into the mold. By employing this invention the use of bolts, nuts and screws is eliminated; the weight of the apparatus is materially decreased; the strength of the structure is greatly increased with less metal, for the rings encircle the entire mold; and the manipulation of the device is much more rapid than with the old form of tire molds commonly employed.

The invention claimed is:—

1. A tire mold comprising annular plates with cavities in their opposing faces, a contractile ring encircling and adapted to engage and hold together the outer edges of the mold plates, means for contracting said contractile ring on the outer edges of the mold plates, an expansion ring encircling and adapted to engage and hold together the inner edges of the mold plates, and means for expanding said expansion ring on the inner edges of the mold plates.

2. The apparatus described by claim 1 characterized by having the engaging faces of the mold plates and rings beveled so that the mold plates may be wedged together by the rings.

3. A tire mold comprising annular plates with cavities in their opposing faces, a contractile ring having internal flanges encircling and adapted to engage and hold together the outer edges of the mold plates means for contracting said contractile ring on the outer edges of the mold plates, an expansion ring having external flanges encircling and adapted to hold together the inner edges of the mold plates, and means for expanding said expansion ring on the inner edges of the mold plates.

4. The apparatus described by claim 3 characterized by having the engaging edges of the mold plates beveled and the inner faces of the ring flanges inclined so that the mold plates may be wedged together between the ring flanges.

5. A tire mold comprising annular plates with cavities in their opposing faces and circular flanges extending from their outer and inner edges, a contractile ring having internal flanges encircling and adapted to engage and hold together the flanges on the exterior of the mold plates, means for contracting said contractile ring on the exterior mold plate flanges, an expansion ring having external flanges encircling and adapted to engage and hold together the flanges on the interior of the mold plates, and means for expanding said expansion ring on the interior mold plate flanges.

6. The apparatus described by claim 5 characterized by having the engaging faces of the mold flanges and ring flanges inclined so that the mold flanges will be wedged between the ring flanges.

7. A tire mold comprising annular plates with cavities in their opposing faces and circular flanges extending outwardly from their peripheries, a flexible contractile ring having inwardly extending flanges on its edges encircling and adapted to engage and hold together the flanges on the exterior of the mold plates, and means for contracting said contractile ring on the exterior mold plate flanges.

8. The apparatus described by claim 7 characterized by having the engaging faces of the mold flanges and ring flanges inclined so that the mold flanges will be wedged between the ring flanges when the ring is contracted.

9. The apparatus described by claim 7 characterized by having means extending outward from the edge of the lower mold plate for supporting the ring when it is expanded.

10. A tire mold comprising annular plates with cavities in their opposing faces and circular flanges extending from their outer edges, a split ring having interior flanges encircling and adapted to engage and hold together said flanges on the mold plates, a lever pivoted to one end of said ring and a link pivoted to the other end of said ring and articulated to said lever at a distance from the fulcrum of the lever, whereby swinging the lever in one direction contracts the ring upon the flanges of the mold plates and swinging the lever in the opposite direction expands said ring off from said flanges.

11. The apparatus described by claim 9 characterized by having a catch for engaging and temporarily holding said lever with the ring contracted.

12. A tire mold comprising annular plates with cavities in their opposing faces and circular flanges extending from their inner edges, a single piece flexible expansion ring having exterior flanges encircling and adapted to engage and hold together said flanges on the mold plates, and means connected to and arranged to exert push and pull on widely separated points of said expansible ring.

13. The apparatus described by claim 12 characterized by having a toggle and turnbuckle for expanding said ring.

14. The apparatus described by claim 12 characterized by having means extending from the lower mold plate for supporting said ring when it is contracted.

15. A tire mold comprising annular plates with cavities in their opposing faces and circular flanges extending outwardly from their peripheries, a contractile ring that is narrower in width than the thickness of the mold plates and has inwardly extending flanges on its edges encircling and adapted to engage and hold together the flanges on the exterior of the mold plates, and means for contracting said contractile ring on the mold plate flanges.

EDMUND W. FOTHERGILL.